United States Patent [19]

Morishita et al.

[11] Patent Number: 4,825,773
[45] Date of Patent: May 2, 1989

[54] TRANSPORTING SYSTEM OF FLOATED-CARRIER TYPE

[75] Inventors: Mimpei Morishita, Fuchu; Teruo Azukizawa, Tokyo, both of Japan

[73] Assignee: Kabushiki Kaisha Toshiba, Kawasaki, Japan

[21] Appl. No.: 134,609

[22] Filed: Dec. 14, 1987

Related U.S. Application Data

[63] Continuation of Ser. No. 826,385, Feb. 5, 1986, abandoned.

[30] Foreign Application Priority Data

Mar. 7, 1985 [JP] Japan .................. 60-146037

[51] Int. Cl.⁴ .............................................. B61B 13/08
[52] U.S. Cl. .................... 104/284; 318/135; 318/687; 104/281
[58] Field of Search ............... 104/281, 286, 284, 293; 318/135, 687; 335/219

[56] References Cited

U.S. PATENT DOCUMENTS 3,849,724 11/1972 Ghibu et al. .................. 104/284
4,395,165 7/1983 DeRobertis et al. .................. 406/88

Primary Examiner—Richard A. Bertsch
Attorney, Agent, or Firm—Oblon, Fisher, Spivak, McClelland, & Maier

[57] ABSTRACT

A transporting system of floated carrier type including a guide rail having a bottom surface portion formed of a ferromagnetic material, a carrier arranged to be freely movable along the guide rail, at least one magnetic supporting unit placed on board the carrier and including electromagnets arranged so as to face the bottom surface portion of the guide rail via gap and a permanent magnet that is placed in the magnetic circuit formed by the electromagnets, the guide rail, and the gap, for supplying magnetomotive force required for floating the carrier. A sensor section is attached to the carrier for detecting changes in the magnetic circuit. The length of the gap is controlled by a zero power feedback loop that stabilizes the magnetic circuit in a state in which the current flowing in the electromagnets is zero, by controlling the exciting current in the electromagnets based on the output of the sensor section. However, the zero power feedback loop is actuated only when the gap length between the electromagnets and the guide rail is within a predetermined range. With this construction, it becomes possible to realize reduced power consumption as well as reduction in size of the system.

14 Claims, 8 Drawing Sheets

TRANSPORTING SYSTEM OF FLOATED-CARRIER TYPE

This application is a continuation of application Ser. No. 826,385, filed on Feb. 5, 1986, now abandoned.

BACKGROUND OF THE INVENTION

1. Field of the Invention

The present invention relates to a transportation system of floated carrier type and, more particularly, to a transportation system of floated carrier type which makes it possible to achieve savings in energy and space.

2. Discussion of Background

Recently, as a part of office automation and factory automation, it is being widely put into practice to transport items such as slips, documents, cash, and reference materials by means of a transporting system among a plurality of spots within a building.

A transporting system to be used for such purposes must move items to be transported fast and quietly. For this reason, in a transporting system of this kind the carrier is supported on guide rails without making contact with the guide rails. In order to support a carrier without making contact with guide rails air or magnetism is generally used to support the carrier. Of these, the magnetic support system may be regarded to be more promising, in view of reduced noise and its excellent followability of the guide rails.

The conventional transporting system of the magnetically floated type is a system for supporting the carrier by means of electromagnets in which the carrier is supported stably through control of the exciting current to the electromagnet. Accordingly, it is necessary to keep the coil of the electromagnet energized at all times which leads to the inevitable drawback that large amounts of electric power are consumed. With this in mind, there has been considered a system in which a majority of the magnetomotive force required for the electromagnets is supplied by permanent magnets in order to reduce the power consumed. Even in such a case, however, when an external force is applied to the carrier, by placing cargo on board the carrier, for instance, it becomes necessary to provide a force through electromagnets to push the carrier to its normal position. Therefore, an increase in the consumed power in this situation also becomes a matter of concern. Moreover, when increased electric power consumption is required for energizing the electromagnets, due to application of external forces to the carrier, it becomes necessary to use a power source with large enough capacity, which disadvantageously leads to a large scale system.

SUMMARY OF THE INVENTION

Accordingly, the objects of the present invention are to provide a transporting system of floated carrier type which makes it possible to achieve both energy conservation and space saving through reduction in the electric power consumed.

The transporting system of floated carrier type in accordance with the present invention is provided with a zero power feedback loop which makes the stationary deviation in current to remain at zero regardless of the presence or absence of the stepwise external forces, and the system is arranged to be operative only when the zero power feedback loop is functioning effectively.

Namely, the transporting system of floated carrier type according to the present invention includes a guide rail having bottom surface sections formed of a ferromagnetic material, a carrier arranged to be freely movable along the guide rails, one or a plurality of magnetic supporting uits which consist of an electromagnet arranged to face the bottom surface of the guide rail with a gap inbetween, a permanent magnet situated in the magnetic circuit formed by the electromagnet, the guide rail and the gap for supplying magnetomotive force required for floating the carrier, the electromagnet and the permanent magnet being placed on board the carrier, a sensor section attached to the carrier which detects changes in the magnetic circuit, and a zero power feedback loop in an operational circuit which stabilizes the magnetic circuit to a state for which the current in the magnetic circuit is zero, by controlling the exciting current for the electromagnet based on the output from the sensor section. In addition, it is equipped with a controlling circuit which causes the zero power feedback loop to operate only when the length of the gap between the electromagnet and the rail is within a predetermined range.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
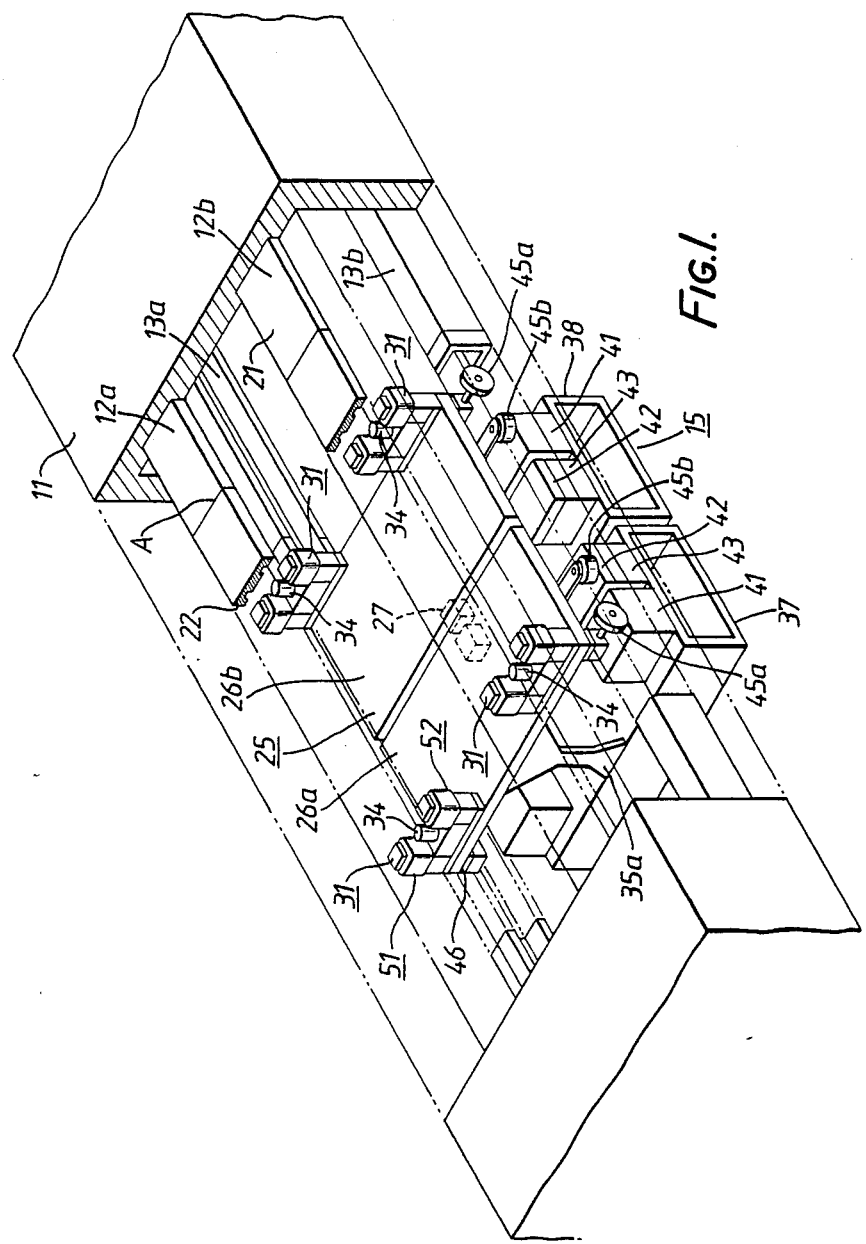
FIG. 1 is a perspective view illustrating an embodiment of the transporting system of the floated carrier type in accordance with the present invention.
Figure 2:
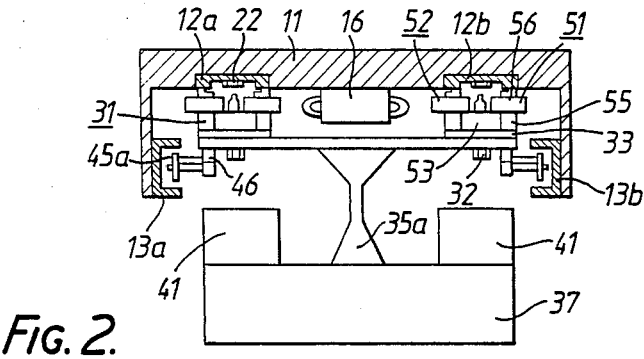
FIG. 2 is a front view, partly broken away, illustrating part of the transporting system of the floated carrier type shown in FIG. 1.
Figure 3:
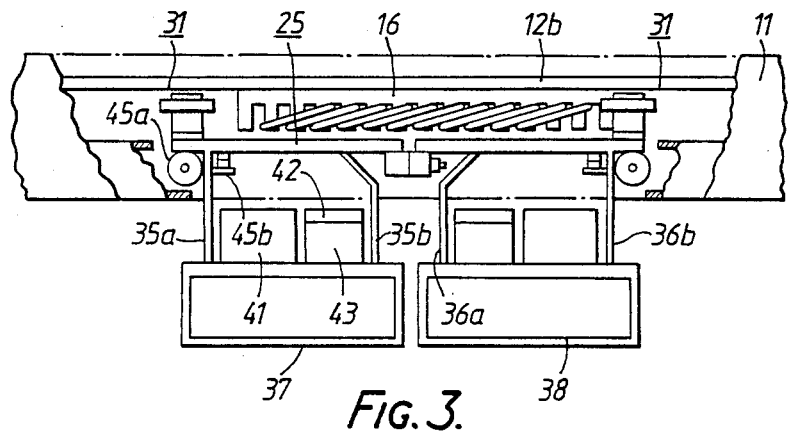
FIG. 3 is a side view, partly broken away, illustrating part of the transporting system of the floated carrier type shown in FIG. 1.

Referring now to the drawings, wherein like reference numerals designate identical or corresponding parts throughout the several views, and more particularly to FIG. 1 to FIG. 3, reference numeral 11 designates a track frame having a cross-sectional form in the shape of an inverted letter U that is laid down in the office space, for example, so as to avoid obstacles. On the inside surface of the top wall of the track frame 11 there are provided a pair of guide rails 12a and 12b in parallel to each other, and on the inner surface of the side walls of the track frame 11 there are provided emergency guides 13a and 13b, each having a cross-sectional in the shape of the letter U placed sidewise, with their respective open sides facing each other. Beneath the guide rails 12a and 12b there is arranged a carrier 15 freely movably along the guide rails 12a and 12b. In addition, in the space between the guide rails 12a and 12b on the inside surface of the top wall of the track frame 11, there is arranged a stator 16 for a linear induction motor along the guide rails at a predetermined distance apart from the guide rails. Here, the stator 16 is one of many stators which are installed in predetermined positions along the guide rails.

The guide rails 12a or 12b are formed by pasting a white vinyl tape 22 on the lower surface of a part 21 with the shape of an inverted U that is formed of a ferromagnetic material. It is given a split construction in order to facilitate installation in the office space. For the joining section A of each pair of parts 21 there is given a predetermined bonding processing.

Next, the construction of the carrier 15 will be described. To begin, there is a platelike support plate 25 arranged so as to face the lower surfaces of the guide rails 12a and 12b. The support plate 25 is constructed by a pair of divided plates 26a and 26b that are arranged parallel to the running rails. A coupling mechanism 27 links the divided plates 26a and 26b so that they are turnable in the plane perpendicular to the direction of running of the rails. At each of the four corners on the upper surface of the support plate 25 there is mounted a magnetic supporting unit 31. These magnetic supporting units 31 are attached to the support plate 25 to be rotatable on the upper surface of the support plate 25 by means of bolts 32 and seats 33. On these magnetic supporting units 31 there are installed optical gap sensors 34 for detecting the length of the gap between the units 31 and the guide rails 12a and 12b. Further, on the lower surface of each of the divided plates 26a and 26b there are installed containers 37 and 38, respectively, for accommodating cargoes via linking parts 35a, 35b, 36a, and 36b. On each of the containers 37 and 38 there are mounted two each, for a total of four, control apparatuses 41 for controlling respective of the four magnetic supporting units 31, constant voltage generating apparatuses 42, and small capacity power sources 43. In addition, at the four corners on the lower surface of the support plate 25, there are installed four vertical wheels 45a for supporting the carrier 15 in the vertical direction and four horizontal wheels 45b for supporting the carrier 15 in the horizontal direction, each of these wheels in an emergency making contact with the inner surfaces of the upper lower or side walls of the emergency guides 13a and 13b that form a mechanical supporting means for supporting the carrier 15 freely movably with respect to the fixed portions of the track frame. The four vertical wheels 45a are mounted on the support plate 25 via piezo-electric rubber elements 46. Each piezo-electric rubber element 46, which consists for example, of pressure sensitive sheet, finds itself in an electrically conducting state only when it receives a force through contact of the vertical wheel 45a to the inner surfaces of the upper and lower walls of the emergency guides 13a and 13b. By this arrangement, it controls the zero power feedback loop in the control apparatus as will be described later. Moreover, the support plate 25 serves also as a conduction plate which is a working element of the linear induction motor mentioned earlier, and it is arranged during working of the system at a height which faces and is separated from the stator 16 by a slight gap.

Figure 4A:
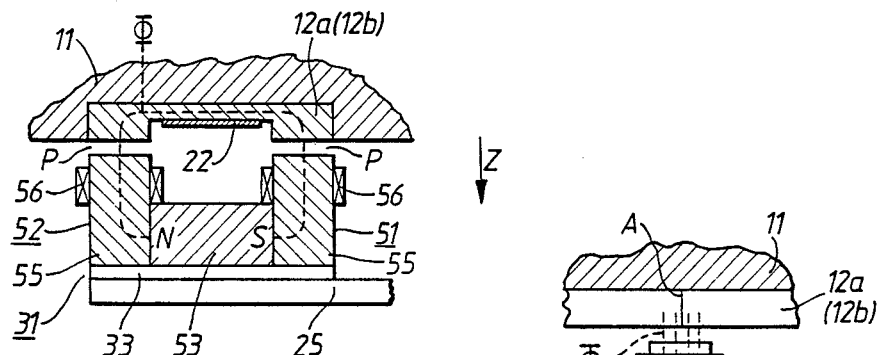
FIG. 4A is a cross-sectional view illustrating the magnetic circuit in the transporting system of the floated carrier type shown in FIG. 1.

As shown in FIG. 4A, the magnetic supporting unit 31 includes of a pair of electromagnets 51 and 52, arranged with their upper surfaces so as to face the lower end sections of the guide rails 12a and 12b, in the direction which is perpendicular to the direction of running of the carrier 15. Unit 31 further includes a permanent magnet 53 which is placed between the lower side surface of each of the electromagnets 51 and 52, thereby forming an overall shape of the letter U. Each of the electromagnets 51 and 52 includes of a yoke 55 formed of a ferromagnetic material and a coil 56 which is wound around the yoke 55. Each of the coils 56 are connected in series such that the magnetic fluxes formed by the electromagnets 51 and 52 mutually add up.

Before describing the control apparatus 41 there will be given the basic ideas concerning the controlling system.

First, the magnetic circuit formed by the magnetic supporting unit 31 and its periphery, namely, the guide rails 12a and 12b, gap P, the yoke 55, and the permanent magnet 53, will be considered. For simplicity, the magnetic flux leakage from the magnetic circuit will be neglected. Now, the magnetic reluctance Rm for the magnetic circuit can be represented by $$Rm = \frac{1}{\mu_o S}\left(2z + \frac{l}{\mu_s}\right), \quad (1)$$

Where $\mu_o$ is the permeability of the vacuum, S is the cross-sectional area of the magnetic circuit, z is the length of the gap, $\mu_s$ is the specific permeability of the portion other than the gap section, and l is the length of the magnetic circuit of the portion other than the gap.

Further, if the intensity of the magnetic field generated in the gap P in the absence of an exciting current through the coil 56 is denoted Hm, the length of the permanent magnet 53 is denoted lm, the total number of turns of the coil 56 is N, and the exciting current through the coil 56 is I, the total magnetic flux $\Phi$ generated in the magnetic circuit will be given by $$\Phi = (NI + Hm\ lm)/Rm \quad (2)$$

Therefore, the total force of attraction F acting between the guide rails 12a, 12b and each of the yokes 55 may be represented by $$F = -\frac{S}{\mu_o}\left(\frac{\Phi}{S}\right)^2 = -\frac{(NI + Hm\, lm)^2}{\mu_o\, Rm^2\, S} \quad (3)$$

Therefore, denoting the direction of gravity by z, the equation of motion for the carrier is given by $$m\frac{d^2z}{dt^2} = -\frac{(NI + Hm\, lm)^2}{\mu_o\, Rm^2\, S} + mg + Um \quad (4)$$

In the above equation, m is the sum of the total mass of the magnetic supporting unit and the mass of the load applied to the magnetic supporting unit, g is the acceleration of gravity, and Um is the external force applied to the magnetic supporting unit.

On the other hand, the magnetic flux number $\Phi_N$ interliked by the coils 56 connected in series is given by $$\Phi_N = (NI + Hm\, lm)N/Rm \quad (5)$$

so that, denoting the total resistance of the coils 56 by R, the voltage equation for the coils 56 is given by the following:

$$\frac{d\Phi_N}{dt} = E - RI, \quad (6)$$

$$\frac{\partial \Phi_N}{\partial I}\frac{dI}{dt} + \frac{\partial \Phi_N}{\partial z}\frac{dz}{dt} = E - RI,$$

$$\frac{N^2}{Rm}\frac{dI}{dt} - \frac{2N}{\mu_o S\, Rm^2}(NI + Hm\, lm)\frac{dz}{dt} = E - RI$$

$$\frac{N^2}{Rm}\frac{dI}{dt} + RI = \frac{2N}{\mu_o S\, Rm^2}(NI + Hm\, lm)\frac{dz}{dt} + E$$

Here, it is noted that Rm is a function of the gap length z, as is clear from Eq. (1). Therefore, it makes sense to linearize Eqs. (4) and (6) in the neighborhood of gap length $z = z_o$, velocity $dz/dt = 0$, and current $I = 0$ by denoting the gap length and the total magnetic reluctance, for the case where, for $I = 0$, the attraction force F and the gravitational force mg are in equilibrium, by $z_o$ and $Rm_o$, respectively. In this case, with infinitesimal quantities $\Delta z$, $\Delta \dot{z}$, and $\Delta i$, z, dz/dt, and I may be represented, respectively by $$z = z_o + \Delta z$$

$$\frac{dz}{dt} = 0 + \Delta \dot{z}$$

$$I = 0 + \Delta i$$

Then, by linearizing the attraction force given by Eq. (4) in the neighborhood of the stationary point $$\left(z, \frac{dz}{dt}, I\right) = (z_o, 0, 0),$$

there is obtained the following expression.

$$F = (F)_{(z_o,0,0)} + \left(\frac{\partial F}{\partial z}\right)_{(z_o,0,0)} \Delta z + \left(\frac{\partial F}{\partial I}\right)_{(z_o,0,0)} \Delta i =$$

-continued $$-\frac{\mu_o S H m^2\, lm^2}{\left(2z_o + \frac{lm}{\mu_s}\right)^2} + \frac{4\mu_o S H m^2\, lm^2}{\left(2z_o + \frac{lm}{\mu_s}\right)^3}\Delta z - \frac{2\mu_o S H m\, lmN}{\left(2z_o + \frac{lm}{\mu_s}\right)^2}\Delta i$$

By setting $$F_o = \frac{\mu_o S H m^2\, lm^2}{\left(2z_o + \frac{lm}{\mu_s}\right)^2} = mg,$$

the above equation may be represented as $$F = -mg + \frac{4mg}{Rm_o}\Delta z - \frac{2Nmg}{Hm\, lm}\Delta i.$$

Hence, Eq. (4) may be represented by $$\Delta \ddot{z} = \frac{4g}{\mu_o Rm_o S}\Delta z - \frac{2gN}{Hm\, lm}\Delta i + \frac{1}{m}Um. \quad (7)$$

Likewise, linearizing Eq. (6) in the neighborhood of the stationary point $(z, dz/dt, I) = (z_o, 0, 0)$, there is obtained $$\Delta \dot{i} = \frac{2Hm\, lm}{N\, \mu_o Rm_o S}\Delta z - \frac{R\, (Hm\, lm)^2}{N^2 mg\, \mu_o Rm_o S}\Delta i + \frac{(Hm\, lm)^2}{N^2 mg\, \mu_o Rm_o S}E \quad (8)$$

Equations (7) and (8) in the above may be expressed as the following equation of state:

$$\frac{d}{dt}\begin{bmatrix}\Delta z \\ \Delta \dot{z} \\ \Delta i\end{bmatrix} = \begin{bmatrix}0 & 1 & 0 \\ a_{21} & 0 & a_{23} \\ 0 & a_{32} & a_{33}\end{bmatrix}\begin{bmatrix}\Delta z \\ \Delta \dot{z} \\ \Delta i\end{bmatrix} + \begin{bmatrix}0 \\ 0 \\ b_{31}\end{bmatrix}E + \begin{bmatrix}0 \\ d_{21} \\ 0\end{bmatrix}Um, \quad (9)$$

Where $a_{21}$, $a_{23}$, $a_{32}$, $a_{33}$, $b_{31}$, and $d_{21}$ are given respectively, by the following.

$$a_{21} = \frac{4g}{\mu_o Rm_o S}, \quad a_{23} = -\frac{2gN}{Hm\, lm}, \quad a_{32} = \frac{2Hm\, lm}{N\, \mu_o Rm_o S},$$

$$a_{33} = -\frac{R\, (Hm\, lm)^2}{N^2 mg\, \mu_o Rm_o S}, \quad b_{31} = \frac{(Hm\, lm)^2}{N^2 mg\, \mu_o Rm_o S}, \quad d_{21} = \frac{1}{m}.$$

For simplicity, Eq. (9) above may be represented by $$\hat{X} = AX + BE + DUm \quad (10)$$

Although the linear system represented by Eq. (9) is unstable in general, it is possible to stabilize it by applying feedback control to the system, i.e., by determining the applied voltage E by various methods from the state vector $(\Delta z, \Delta \dot{z}, \Delta i)$ represented by Eq. (9) and the acceleration $\Delta \ddot{z}$. For instance, if the applied voltage E is chosen as $$E = -(F_1, F_2, F_3) \times C \times X = -FCX, \quad (11)$$

where C is the output matrix (it will be a unit matrix in that case) and $F_1$, $F_2$, and $F_3$ are feedback constants, Eq. (10) becomes $$\dot{X} = AX - BFCX + DUm. \quad (12)$$

If X is solved by Laplace transforming Eq. (10), there will be obtained $$X = \zeta^{-1}\{[SI - A + BFC]^{-1}(Xo + DUm(s))\}, \quad (13)$$

where I is the unit matrix and Xo is the initial value for X.

If Um in Eq. (13) is assumed to be a stepwise external force, then the stability of X will be ensured for the case where all of the characteristic roots of the determinant det $|\Phi(s)|^*$ of the state transition matrix $\Phi(s)$ given by $$\Phi(s) = (SI - A + BFC)^{-1} \quad (14)$$

are located in the left-half of the complex plane for S. The characteristic equation det $|\Phi(s)| = 0$ for $\Phi(s)$ in the case of Eq. (9) is given by $$s^3 + (b_{31}F_3 - a_{33})s^2 + \{-a_{21} + a_{23}(b_{31}F_2 - a_{32})\}s + a_{23}b_{31}F_1 - a_{21}(b_{31}F_3 - a_{33}) = 0. \quad (15)$$

Figure 5:
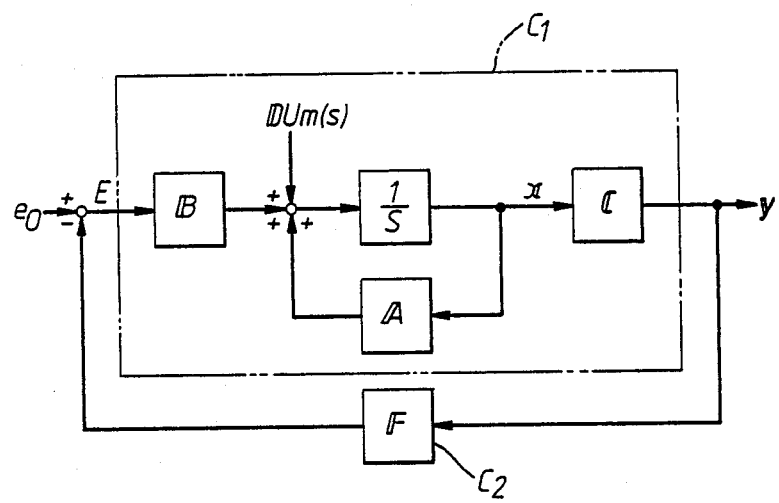
FIG. 5 is a block diagram for illustrating the controlling process of a prior art system of the magnetic supporting unit.

Thus, it becomes possible to accomplish stabilization of the magnetic floating system by arbitrarily determining the configuration in the complex s plane of the characteristic roots of det $|\Phi(s)| = 0$ through suitable choice of the values of $F_1$, $F_2$, and $F_3$. A block diagram for the case in which such a feedback control is applied to the magnetic supporting unit of the magnetic floating system is illustrated in FIG. 5. In this instance, a feedback gain compensator $C_2$ is added to the control object $C_1$. In the figure, Y represents CX.

In such a magnetic floating system, accompanying the changes in the stepwise external force Um and the bias voltage $e_o$ of the applied voltage E, there will be generated the following stationary deviations $\Delta z_s$ and $\Delta i_s$ in the gap length deviation $\Delta z$ and in the current deviation $\Delta i$, respectively, in the stable state of the system:

$$\Delta z_s \doteq \frac{-d_{21}(-a_{33} + b_{31}F_3)Um - b_{31}a_{23}e_o}{a_{21}\left(-a_{33} + b_{31}F_3 - \frac{a_{23}}{a_{21}}b_{31}F_1\right)}, \quad (16)$$

$$\Delta i_s = \frac{d_{21}b_{31}F_1 Um + b_{31}a_{21}e_o}{a_{21}\left(-a_{33} + b_{31}F_3 - \frac{a_{23}}{a_{21}}b_{31}F_1\right)}. \quad (17)$$

The present invention is characterized by that, only when the gap length deviation $\Delta z$ is within a predetermined range, feedback control is applied to the magnetic control unit 31 so as to make the stationary current deviation $\Delta i_s$, of the stationary deviations given by Eqs. (16) and (17), to be zero, regardless of the presence or absence of a stepwise external force Um.

In order to control the stationary current deviation $\Delta i_s$ to zero only when the gap length is found to be in a fixed range, the present invention can be implemented by adoption of, for example, one of the following control methods:

(1) A method in which observation on the external force Um is made by means of a state observor, and the observed value Um is fed back to the magnetic floating system by giving a suitable gain to the observed value.

(2) A method in which suitable gains that do not vanish simultaneously are given to the gap length deviation $\Delta z$, the velocity deviation $\Delta \dot{z}$ and the current deviation $\Delta i$, and each of these is fed back to the magnetic floating system via a delay element, for instance, which constitutes a first order system in s.

(3) A method in which the current deviation $\Delta i$ is integrated by means of an integrating compensator, and its output value is fed back with suitable gain to the magnetic floating system.

(4) A method in which some of the items (1), (2), and (3) in the above are used at the same time, or others. In what follows, means of realizing the feedback in the above will be referred to as the zero power feedback loop.

In the following, the method (3) will be described as an example.

Figure 6:
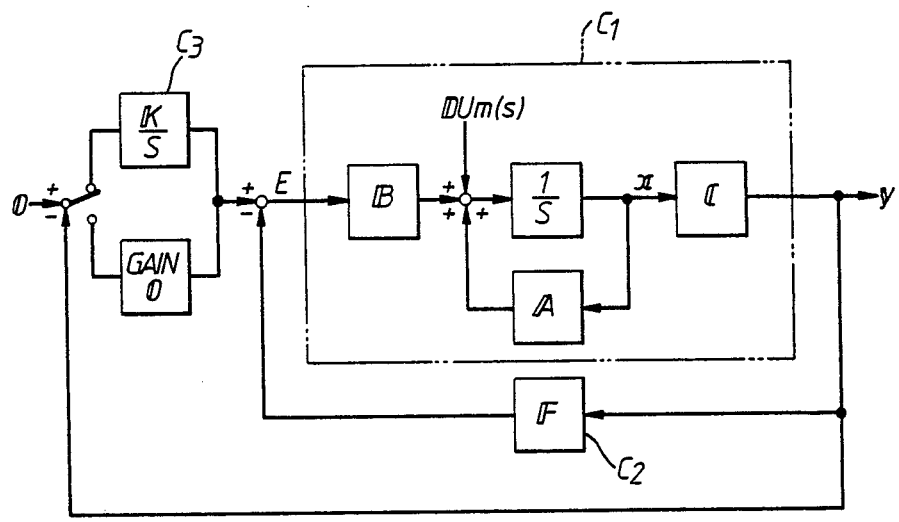
FIG. 6 is a block diagram illustrating an improved controlling process for the magnetic supporting unit according to the invention.

The block diagram for a magnetic floating system employing the method (3) noted above is illustrated by FIG. 6. Namely, in the method, there is augmented an integrating compensator $C_3$ to the feedback compensator $C_2$ mentioned earlier, and there is further added a means for arbitrarily interrupting the function of the integrating compensator $C_3$. The gain K of the integrating compensator $C_3$ is a matrix that can be expressed as $K = (0, 0, K_3)$, where $K_3$ is the integrated gain of the current deviation $\Delta i$. Therefore, the applied voltage E for the magnetic floating system can be represented by $$E = -FCX - KC \int_0^t X \, dt$$

The state transition matrix $\Phi(s)$ obtained analogous to the previous case is given by $$\Phi(s) = (s^2I - sA + sBFC + BKC)^{-1}. \quad (19)$$

The transfer function G(s) when the external force Um is the input and Y expressed by Y=CX is the output is given by G(s)=s $\Phi(s)$E, by $$G(s) = \frac{1}{\Delta(s)} \begin{bmatrix} \{s^2 + (b_{31}F_3 - a_{33})s + b_{31}K_3\}d_{21} \\ \{s^2 + (b_{31}F_3 - a_{33})s + b_{31}K_3\}s d_{21} - \\ \{(b_{31}F_2 - a_{32})s + b_{31}F_1\}s d_{21} \end{bmatrix} \quad (20)$$

with $$\Delta(s) = s^4 + (b_{31}F_3 - a_{33})s^3 + \{b_{31}K_3 - a_{21} + a_{23}(b_{31}F_2 - a_{32})\}s^2 + \{a_{23}b_{31}F_1 - a_{21}(b_{31}F_3 - a_{33})\}s - a_{21}b_{31}K_3 \quad (21)$$

The characteristic roots of the transfer function G(s) can be found by solving $\Delta(s) = 0$ where $\Delta(s)$ is given by Eq. (21) so that it is possible to realize stabilization of the magnetic floating system given by FIG. 6 through appropriate choice of $F_1$, $F_2$, $F_3$ and $K_3$.

Here, if the magnetic floating system shown by the figure is assumed to be stable, the response of the deviation current Δi to the external force Um can be determined by the use of the Laplace transformation as $$\Delta i(s) = -\frac{d_{21}}{\Delta(s)}\{(b_{31}F_2 - a_{32})s + b_{31}F_1\}sUm(s) \quad (22)$$

Since the external force Um is stepwise, by calling the magnitude of the external force $F_o$, it is given by $Um(s) = F_o/s$, and hence Eq. (22) becomes $$\Delta i(s) = -\frac{d_{21}}{\Delta(s)}\{(b_{31}F_2 - a_{32})s + b_{31}F_1\}F_o \quad (23)$$

Since Eq. (23) guarantees $$\lim_{t \to \infty} \Delta i \to 0,$$

it is clear that means for letting the stationary current deviation $\Delta i_s$ tend to zero does in fact exist regardless of the presence or absence of the external force.

In addition, the detection of the elements of the state vector X may be carried out, for instance, by one of the following methods.

(1) A method in which all the elements are measured directly by the use of suitable sensors.

(2) A method in which $\Delta z$, $\Delta \dot{z}$, and others are detected through integration by an integrator or through differentiation by a differentiator, as may be needed, of the output signal of either one of a suitable gap sensor, velocity sensor, or acceleration sensor.

(3) A method in which two elements of the state vector are detected by utilizing method (1) or (2) above, and the remaining elements, if need, are observed by the state observer along with the external force Um as explained earlier.

According to the present invention, the control described in the foregoing will be applied only when the gap P is found within a fixed range. The reason for making such an arrangement is to avoid the actuation of the control system by regarding the resistive force from the guide rails 12a and 12b on the carrier 15 as an external force when the state of floatation of the carrier 15 is broken due to its contact with, or attachment to, the guide rails 12a and 12b.

Figure 7:
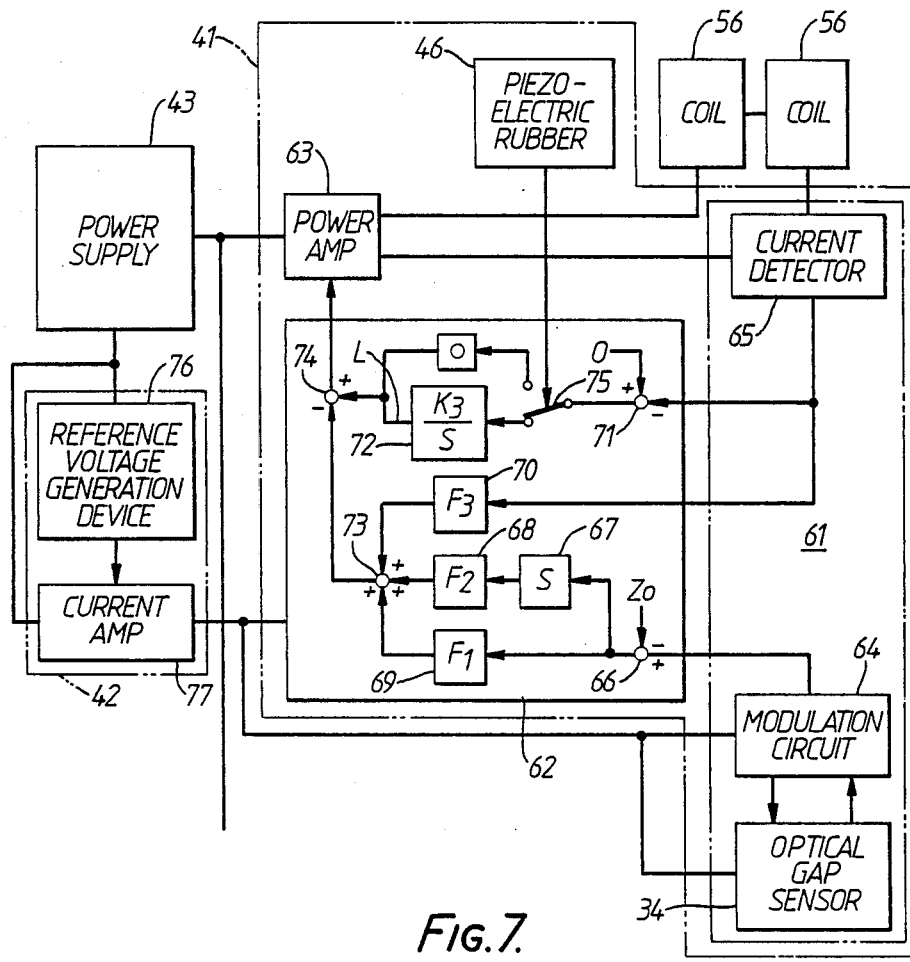
FIG. 7 is a block diagram for illustrating the circuit in the control apparatus for controlling the current that flows in the coil of the magnetic supporting unit in the transporting system of the floated carrier type shown in FIG. 1.
Figure 8:
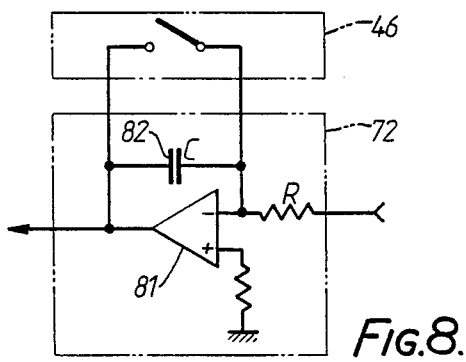
FIG. 8 is a circuit diagram for illustrating the integration compensator and its periphery in the controlling apparatus shown in FIG. 7.

With such a situation in mind, the control apparatus 41 is constructed, for example, as shown in FIG. 7. In the control apparatus 41 which realizes the control system shown by FIG. 6, arrows indicate the signal routes while solid lines show the power routes.

The control apparatus 41 includes a sensor section 61 which is installed on the carrier 15 for detecting the magnetomotive force or magnetic reluctance in the magnetic circuit formed by the magnetic supporting unit 31, or changes in the motion of the carrier 15, an operational circuit 62 for computing electric power to be supplied to the coils 56 based on the signal from the sensor section 61, and a power amplifier 63 for supplying electric power to the coils 56 based on the signal from the operational circuit 62, and four of these combined control each of the four magnetic supporting units 31. The sensor section 61 includes a modulation circuit 64 for modulating the signal from the optical gap sensor 34 in order to suppress the influence of external noise and a current detector 65 for detecting the value of the current in the coils 56. The operational circuit 62, on the one hand, receives the signal from the optical gap sensor 34 via the modulation circuit 64, subtracts the set value $z_o$ for the gap length from the signal by means of a subtractor 66, and introduces the output from the subtracter 66 directly to a feedback gain compensator 68 and via a differentiator 67 to a gain compensator 69, respectively. On the other hand, the operational circuit 62 introduces the signal from the current detector 65 to a feedback gain compensator 70, and moreover, it compares at a subtractor 74 the signal, which is obtained by an adder 73 as the resultant of the outputs from the three feedback gain compensators 68–70, with the signal, which is compensated by an integrating compensator 72 after it is received from the current detector 65 and is compared with zero signal at a subtractor 71, in order to output the deviation between the two signals to the power amplifier 63. By the above arrangement there is formed a zero power feedback loop L of a subtractor 71, and integrating compensator 72, and a subtractor 74. In addition, between the subtractor 71 and the integrating compensator 72 there is inserted a switch 75 for selectively nullifying the function of the integrating compensator 72. The switch 75 is actuated in response to the pressure detection by the piezo-electric rubber element 46 described earlier. More specifically, it only needs to be constructed so as to short-circuit the capacitor 82 which is connected between the input and the output of an operational amplifier 81 that forms the integrating compensator 72 by means of the switching operation of the piezo-electric rubber element 46 which takes place at the time of application of pressure. By so arranging, the gain $K_3 = -1/RC$ of the integrating compensator 72 becomes zero due to conduction of the piezoelectric rubber element 46 so that the output of the operational amplifier 81 also becomes zero.

Moreover, the constant voltage generator 42 which is inserted between the power source 43 and the control apparatus 41 supplies currents that are at constant voltage at all times to the modulation circuit 64, the operational circuit 62, and the optical gap sensor 34. The constant voltage generator 42 eliminates any influence on the control apparatus 41 from voltage lowering caused by the variation in the load of the power source 43, and is constructed by a reference voltage generating unit 76 and a current amplifier 77 which supplies required current at constant voltage at all times to the control apparatus 41 based on the output signal from the reference voltage generator 76.

Next, the operation of the transporting system of the floated carrier type according to the present embodiment constructed in the above manner will be described.

Figure 4B:
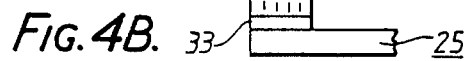
FIG. 4B is a side view for explaining the operation of the transporting system of the floated carrier type shown in FIG. 1.

When the system is in the resting state, the zero power feedback loop L that includes the integrating compensator 72 will not be actuated since the vertical wheel 45a of the carrier 15 are making contact with either of the upper or lower walls of the emergency guides 13a and 13b, and hence a pressure is applied to the piezo-electric rubber 46. Accordingly, the system will not be controlled with the resistive force from the emergency guides 13a and 13b as an external force. Therefore, if the system is actuated in this state, the control apparatus 41 causes generation of magnetic flux in the electromagnets 51 and 52 in the same direction or in the opposite direction to the magnetic flux generated by the permanent magnet 53, and controls the current flowing in the exciting coils 56 so as to create a gap with predetermined width between the magnetic supporting unit 31 and the guide rails 12a and 12b. In this way, there is formed a magnetic circuit in the route of the permanent magnet 53, yoke 55, gap P, guide rail 12a (12b), gap P, yoke 55, and back to the permanent magnet 53, as shown in FIGURE 4A. The magnetic flux Φ formed in this magnetic circuit is generated, as shown in FIG. 4B, so as to lie in a plane perpendicular to the direction of running of the carrier 15. Because of this, even at the time when the carrier 15 passes by the joining section A of the guide rails 12a and 12b in its process of movement, the direction in which the magnetic flux Φ is generated coincides with the surface of conjunction, so that the magnetic flux will never cross the joint A. Therefore, it becomes possible to suppress the change in magnetic reluctance and to achieve stabilization in the control performance at the time of passage of the joining section A. When the carrier is put in a floated state in this way, the zero power feedback loop will be actuated because the piezo-electric rubber 46 then has a high impedance. Thus, the magnetic circuit maintains a predetermined gap length $z_o$ so as to generate a magnetic force of attraction which does not at all require magnetic fluxes due to the electromagnets 51 and 52, under the state in which there is applied no external force on the carrier 15.

If an external force Um is applied in this state, the gap sensor 34 detects it and sends out the detection signal to the operational circuit 62 via the modulation circuit 64. The operational circuit 62 subtracts the set value $z_o$ of the gap length from the above signal by means of the subtractor 66 to compute the gap length deviation signal Δz. The gap length deviation signal Δz is input to the feedback gain compensator 69, and is input also to the feedback gain compensator 68 after it is converted to a velocity deviation signal $\Delta\hat{z}$ by the differentiator 67. On the other hand, the current deviation signal Δi which is obtained from the measured signal of the current detector 65 is input to the feedback gain compensator 70. In addition, the current deviation signal Δi is compared with the zero level by the subtractor 71 and the difference signal is input to the integrating compensator 72. Then, the output signal obtained by summing the outputs from the three feedback gain compensators 68 to 70 and the signal from the integrating compensator 72 are fed back, with gains respectively added, to the power amplifier 63. In this way, the system will be stabilized to a state in which the current deviation Δi vanishes.

Furthermore, in case the impact at the time of application of the external force Um is too strong such that the carrier is attracted to the guide rails 12a and 12b or tends to fall off from the guide rails 12a and 12b, the zero power feedback loop stops functioning so that it becomes possible to go back immediately to the floated situation.

Moreover, it should be noted that the present invention is not limited to the embodiments described in the foregoing. Thus, for instance, the method employed in the above embodiments in which the current deviation Δi is integrated by an integrating compensator and the result of which is fed back with a suitably given gain, may be arranged to be controlled by other methods that are described in the foregoing.

Figure 9:
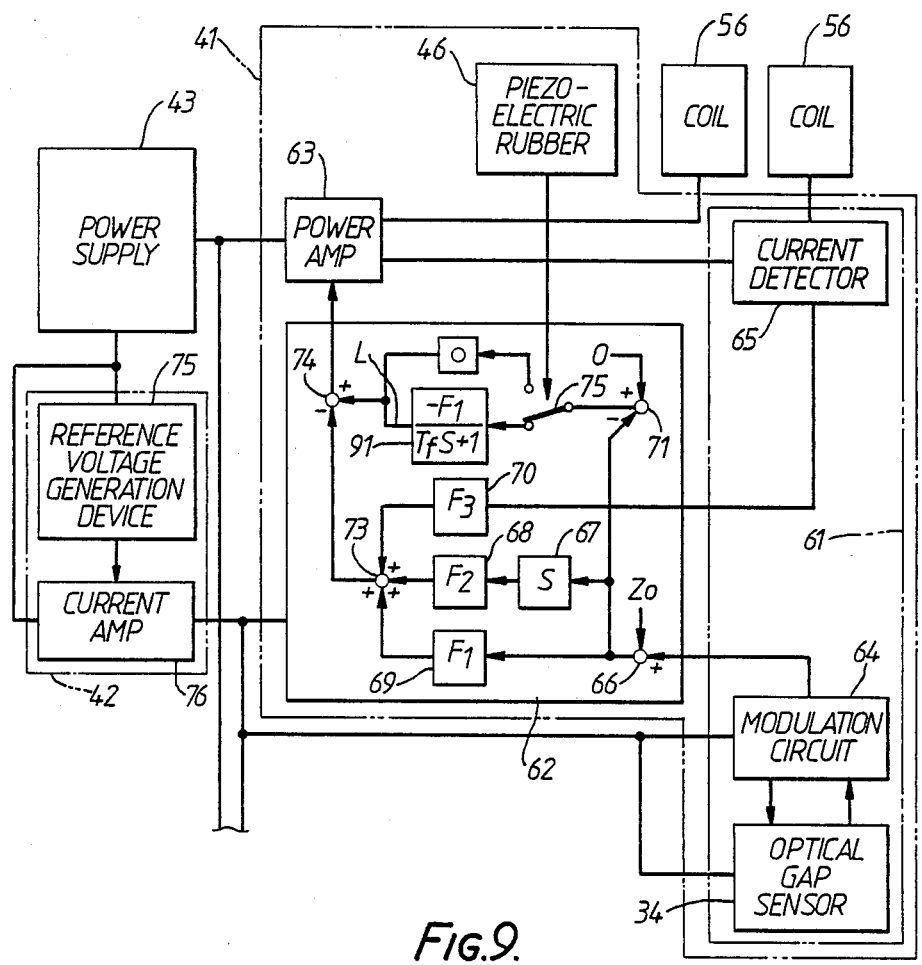
FIGS. 9 to 14 are block diagrams illustrating the controlling system for the magnetic controlling unit in other embodiments of the transporting system of the floated carrier type shown in FIG. 1.

For instance, the arrangement illustrated by FIG. 9 is an example in which the integrating compensation in FIG. 7 is replaced by a filter 91 with first order transfer function. With the time constant of the filter 91 denoted by $T_f$, its transfer function is defined by $$G_f(s) = \frac{-F_1}{T_f s + 1}$$

Figure 10:
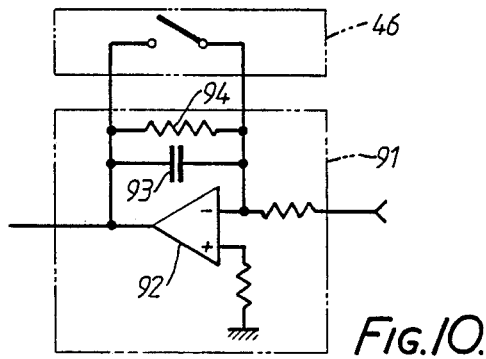

In addition, although the output of the current detector 65 is given as the input to the subtractor in the examples described earlier, it is given by the output of the subtractor 66 in the present example. The filter 91 is constructed, for example, by connecting a capacitor 93 and a resistor 94 between the input and the output of the operational amplifier 92, as shown by FIG. 10. In this case, too, the function of the zero power feedback loop L can be interrupted by short circuiting both ends of the capacitor 93 and the resistor 94 by the piezo-electric rubber element 46.

Figure 11:
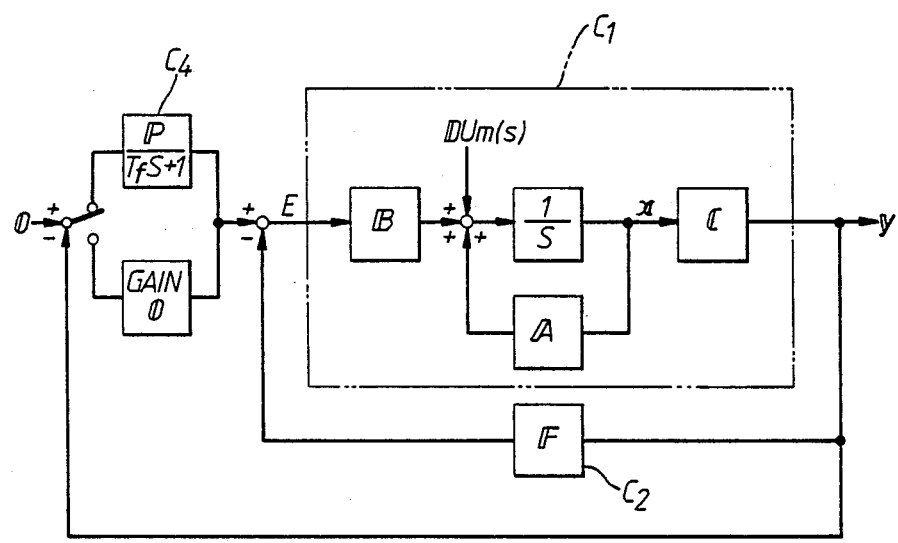

This system has the advantage that it is possible, in the existing magnetically floated system that employs the control system based on FIG. 5, to add a zero power feedback loop L while maintaining a stable magnetically floated state, by setting $T_f$ at an appropriately large value without specially recomputing the feedback gain F=($F_1$, $F_2$, $F_3$). If it is chosen that P=($-F_1$, 0, 0), its block diagram is shown by FIG. 11.

Figure 12:
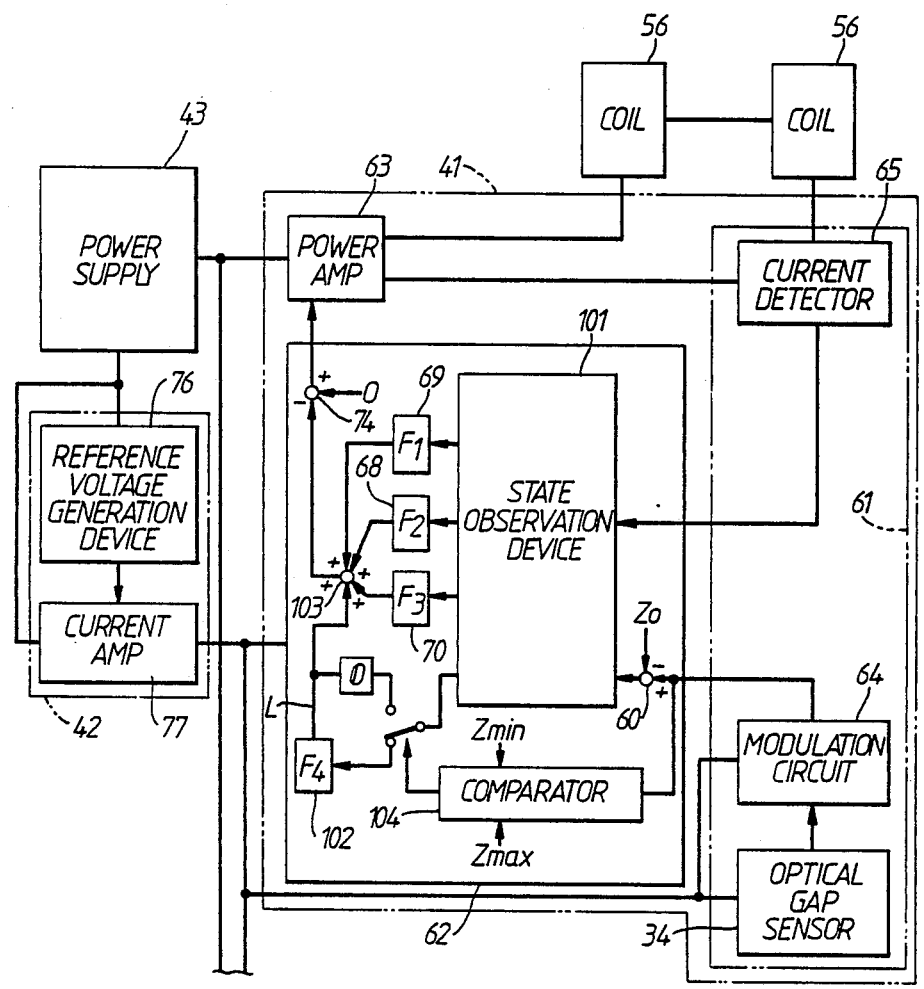

Furthermore, FIG. 12 shows the control method that employs a state observer 101. The state observer 101 detects the velocity $\Delta\hat{z}$ that corresponds to the output of the differentiator 67 in the previous example and the stationary component in the external force Um applied to the carrier 15, by receiving the output signals of the subtractor 66 and the current detector 65 as the inputs, and outputs the gap length deviation signal, the velocity signal, the current deviation signal, and the signal for stationary component of the external force that are to become the inputs to the feedback gain compensators 68, 69, 70, and 102, respectively. The four feedback gain compensators 68 to 70 and 102 output the results in which the inputs are multiplied by the gains $F_1$, $F_2$, $F_3$ and $F_4$, respectively. These outputs are summed at an adder 103, and the result is output to the amplifier 63 after being compared with the zero signal at the subtractor 74. Here, $F_4$ is given by $$F_4 = \frac{d_{21}}{a_{21}} F_1$$

Figure 13:
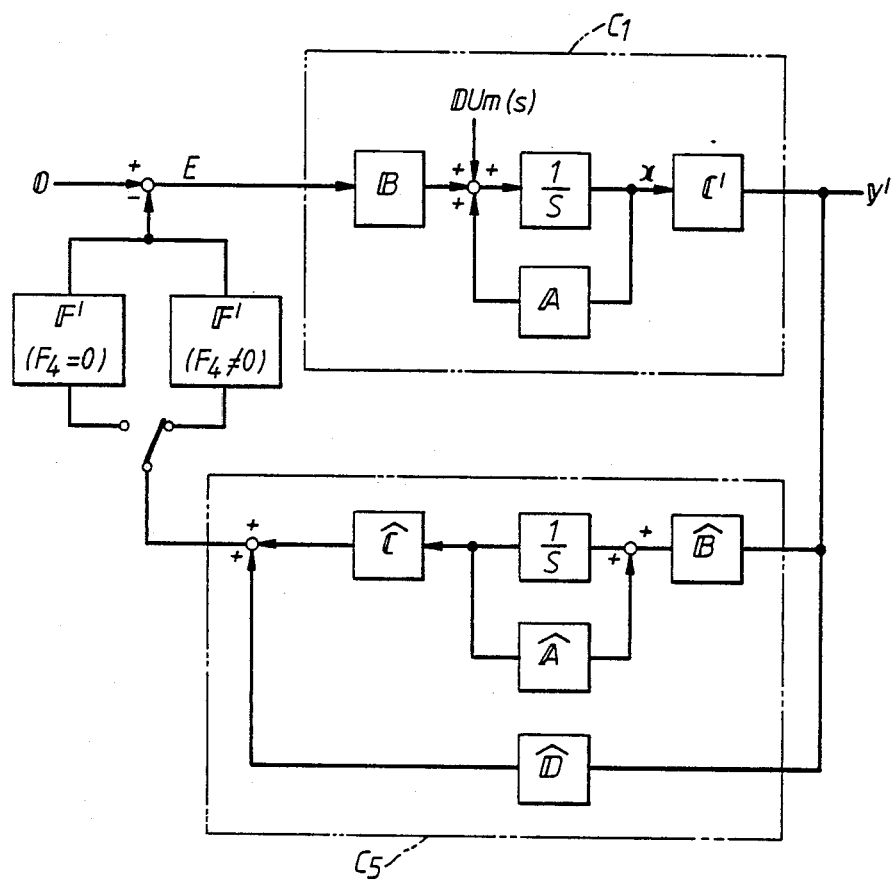

In FIG. 13 is illustrated a block diagram for the control system. The construction of the state observer 101 is shown by $C_5$ in the figure. In the figure, $$\hat{A} = \begin{bmatrix} -a_{11} & d_{21} \\ -a_{21} & 0 \end{bmatrix}, \hat{B} = \begin{bmatrix} a_{21} + d_{21} & a_{21} - a_{11}^2 & a_{23} \\ -a_{11} & a_{21} & 0 \end{bmatrix},$$

$$\hat{C} = \begin{bmatrix} 0 & 1 & 0 & 0 \\ 0 & 0 & 0 & 1 \end{bmatrix}^T, \hat{D} = \begin{bmatrix} 1 & a_{11} & 0 & a_{21} \\ 0 & 0 & 1 & 0 \end{bmatrix}^T,$$

$$C = \begin{bmatrix} 1 & 0 & 0 \\ 0 & 0 & 1 \end{bmatrix}, F = [F_1 \; F_2 \; F_3 \; F_4],$$

$$Y = [\Delta z \; \Delta i]^T,$$

Where $\alpha_{11}$ and $\alpha_{21}$ are constants that may suitably be chosen so as to have the characteristic roots of det $|sI-A|=0$ in the left-half plane of the complex s plane.

Figure 14:
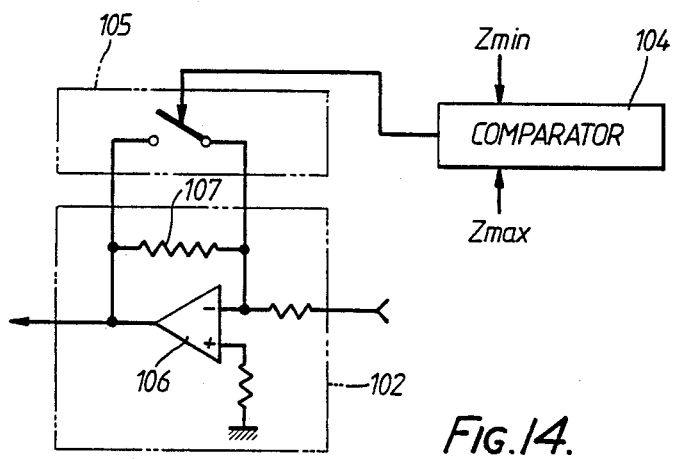

On the other hand, the periphery of the feedback gain compensator 102 is constructed as shown by FIG. 14, for example, to be able to short-circuit a resistor 107 which is connected between the input and the output of an operational amplifier 106 by controlling the ON-OFF operation of a contactless relay 105 with the signal from a comparator 104. The comparator 104 outputs a signal that causes the contactless relay 105 to be turned off if the gap P is within the range of a minimum gap length z min and a maximum gap length z max that are set in advance, and outputs otherwise a signal that causes it to be turned on, to interrupt the operation of the zero power feedback loop L.

According to this embodiment, the velocity deviation $\Delta\dot{z}$ can be measured without the use of a differentiator so that it becomes possible to minimize the influence of the external electrical noise on the carrier 15 which is kept floating. Moreover, since the operation of the zero power feedback loop L is feasible under the state in which the carrier 15 is not making contact with the guide rails 12a and 12b, it becomes possible to reduce the impact on the carrier 15 compared with the case in which use is made of the piezo-electric rubber element 46.

Additionally, the present invention can be applied to the case of the velocity sensor or the acceleration sensor instead of the gap sensor 34 and the current detector 65. For example, in the case where an acceleration sensor is used in place of the gap sensor 34, the gap length detection can be achieved by integrating the output of the acceleration sensor twice. In this case, there is the advantage that the position for setting the sensor can arbitrarily be chosen within a range in which it is possible to accomplish the detection of the acceleration of the magnetic supporting unit 31.

Moreover, as a method for detecting the range in which the zero power feedback control is to be made, use can be made of means such as the limit switch other than the piezoelectric rubber element or a comparator.

Furthermore, the present invention may be applied to any kind of construction so long as it is a control apparatus equipped with a zero power feedback control system, irrespective of its being analog or digital.

As in the above, various modifications can be realized within the scope of the invention and which do not deviate from the principal points of the present invention.

According to the present invention, current flows in the coils for the electromagnet only transitionally at the time of application of an external force to the carrier since it is arranged that the part that corresponds to the magnetic force required by the electromagnets is compensated by a permanent magnet, and further, that the stationary value of the exciting current that flows in the electromagnets is set to be zero regardless of whether or not there is present an external force applied to the carrier. Therefore, according to the present invention, it is possible to reduce the power consumed in the coil markedly compared with the conventional method, reducing the burden on the power source. In other words, the present invention can contribute substantially toward conservation of energy.

Moreover, with such a reduction in the burden on the power source, it suffices to provide a carrier power source with small capacity. Therefore, space savings can be realized, since the system can make use of a power source that is small in size and light in weight.

In addition, the present invention, avoids the inconvenience of having the system controlled by detecting a contact or attachment of the carrier to the guide rails for some reason, such as due to an external force, since it is designed to let the zero power feedback loop function only when the gap length is within a predetermined range. Therefore, it is possible to revert immediately to the floated state without excessive power consumption by the electromagnets. This fact signifies on the one hand that there will take place a smooth transition of the system from the attached state at the start to the floated state, and on the other hand, that there will exist no possibility of having stoppage by attachment of the carrier to the guide rails during its running. Thus, according to the present invention, it becomes possible to reduce the time required for the starting of the system as well as to secure a highly reliable flow of items.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A transporting system of floated carrier type for transporting items to be transported to a designated position, comprising:
   a guide rail having a bottom surface portion formed of a ferromagnetic material;
   a carrier which is freely movable along the guide rail;
   at least one magnetic supporting unit placed on said carrier and comprising electromagnets arranged so as to face the bottom surface of said guide rail and be separated therefrom by a gap, and a permanent magnet that is placed in the magnetic circuit formed by said electromagnets, said guide rail, and said gap, for supplying magnetomotive force required for floating of said carrier;
   a sensor section attached to said carrier for detecting changes in said magnetic circuit; and
   control means for controlling the exciting current in said electromagnets based on an output of the sensor section, comprising,
   a zero power feedback loop that stabilizes said magnetic circuit under the state in which the current flowing in said electromagnets is zero,
   means for detecting a contact with or falling off from said guide rail of said carrier, and
   means for interrupting the operation of said zero power feedback loop when said contact detecting means detects a contact or fall-off of said carrier.

2. A transporting system of floated carrier type as claimed in claim 1, wherein said zero power feedback loop comprises:
   a state observer for monitoring the magnitude of an external force based on the output of said sensor section; and
   means for feeding back as part of said exciting current signal having a magnitude corresponding to the external force, monitored by said state observer, multiplied by a predetermined gain.

3. A transporting system of floated carrier type as claimed in claim 1, in which said sensor section comprises means for detecting deviations in the lengths of said gap, a velocity of said carrier in the direction of said gap length and the exciting current, wherein said zero power feedback loop comprises:
  means for giving predetermined gains that do not simultaneously vanish to each of the deviations of the gap length between said electromagnets and said guide rail, the velocity in the direction of said gp length of said carrier, and the exciting current in said electromagnets; and
  means for feeding these deviations back as part of said exciting current via a filter at least having a first order transfer function.

4. A transporting system of floated carrier type as claimed in claim 1, in which said sensor section comprises means for detecting deviations in said exciting current and wherein said zero power feedback loop comprises:
  an integrating compensator for integrating the detected deviation in said exciting current with a predetermined gain; and
  means for feeding the output value of the integrating compensator back as part of said exciting current.

5. A transporting system of floated carrier type as claimed in claim 1, in which said contact detecting means includes vertical wheels for supporting the carrier in the vertical direction.

6. A transporting system of floated carrier type as claimed in claim 5, comprising:
  a track frame on which said guide rail is mounted;
  an emergency guide having inner wall surface mounted on said track frame; and
  said vertical wheels supporting the carrier by making contact with the inner wall surfaces of the emergency guide.

7. A transporting system of floated carrier type as claimed in claim 6, in which said emergency guide has a cross-sectional shape in the shape of the letter U placed sideways and that is provided on the inner surface of a side wall of the track frame.

8. A transporting system of floated carrier type for transporting items to be transported to a designated position, comprises:
  a guide rail having a bottom surface portion formed of a ferromagnetic material;
  a carrier which is freely movable along the guide rail;
  at least one magnetic supporting unit placed on said carrier and comprising electromagnets arranged so as to face the bottom surface of said guide rail and be separated therefrom by a gap, and a permanent magnet that is placed in the magnetic circuit formed by said electromagnets, said guide rail, and said gap, for supplying magnetomotive force required for floating of said carrier;
  a sensor section attached to said carrier for detecting changes in said magnetic circuit, and for obtaining the gap length between said electromagnets and said guide rail; and
  control means for controlling the exciting current in said electromagnets based on an output of the sensor section, comprising,
  a zero power feedback loop that stabilizes said magnetic circuit under the state in which the current flowing in said electromagnets is zero,
  a comparator for comparing the detected value of said gap length with at least one of a predetermined range for said gap length required for the operation of said zero power feedback loop, and
  means for controlling the operation of zero power feedback loop in response to the output of the comparator.

9. A transporting system of floated carrier type as claimed in claim 8, wherein said zero power feedback loop comprises:
  a state observer for monitoring the magnitude of an external force based on the output of said sensor section; and
  means for feeding back as part of said exciting current a current signal having a magnitude corresponding to the external force, monitored by said stated observer, multiplied by a predetermined gain.

10. A transporting system of floated carrier type as claimed in claim 8, in which said sensor section comprises means for detecting deviations in the length of said gap, a velocity of said carrier in the direction of said gap length and the exciting current, wherein said zero power feedback loop comprises:
  means for giving predetermined gains that do not simultaneously vanish to each of the deviations for the gap length between said electromagnets and said guide rail, the velocity in the direction of said gap length of said carrier, and the exciting current in said electromagnets; and
  means for feeding these deviations back as part of said exciting current via a filter at least having a first order transfer function.

11. A transporting system of floated carrier type as claimed in claim 8, in which said sensor section comprises means for detecting deviations in said exciting current and wherein said zero power feedback loop comprises:
  an integrating compensator for integrating the detected deviation in said exciting current with a predetermined gain; and
  means for feeding the output value of the integrating compensator back as part of said exciting current.

12. A transporting system of floated type as claimed in claim 8, in which the detected value of said gap length is detected by means of said sensor section provided on the carrier.

13. A transporting system of floated carrier type as claimed in claim 12, in which said sensor section is gap sensor.

14. A transporting system of floated carrier type as claimed in claim 13, in which said gap sensor is installed on an upper surface of the carrier, and is used for measuring the gap beneath the guide rail.

* * * * *